July 4, 1939.  T. A. COHEN  2,164,701
WHEATSTONE BRIDGE RELAY ARRANGEMENT
Filed Nov. 16, 1934    5 Sheets-Sheet 1

INVENTOR.
Theodore A Cohen
BY Theodore W. Miller
ATTORNEY.

July 4, 1939.   T. A. COHEN   2,164,701
WHEATSTONE BRIDGE RELAY ARRANGEMENT
Filed Nov. 16, 1934   5 Sheets-Sheet 2

INVENTOR.
Theodore A. Cohen.
BY Theodore W. Miller
ATTORNEY.

July 4, 1939.  T. A. COHEN  2,164,701
WHEATSTONE BRIDGE RELAY ARRANGEMENT
Filed Nov. 16, 1934   5 Sheets-Sheet 3

INVENTOR.
Theodore A. Cohen
BY Theodore W. Miller
ATTORNEY.

July 4, 1939.  T. A. COHEN  2,164,701
WHEATSTONE BRIDGE RELAY ARRANGEMENT
Filed Nov. 16, 1934   5 Sheets-Sheet 4

INVENTOR.
Theodore A. Cohen.
BY Theodore W. Miller
ATTORNEY.

July 4, 1939. T. A. COHEN 2,164,701
WHEATSTONE BRIDGE RELAY ARRANGEMENT
Filed Nov. 16, 1934 5 Sheets-Sheet 5

INVENTOR.
Theodore A. Cohen,
BY Theodore W. Miller
ATTORNEY.

Patented July 4, 1939

2,164,701

UNITED STATES PATENT OFFICE 2,164,701

WHEATSTONE BRIDGE RELAY ARRANGEMENT

Theodore A. Cohen, Chicago, Ill., assignor to Wheelco Vacuum Products Company, a corporation of Illinois Application November 16, 1934, Serial No. 753,410

3 Claims. (Cl. 175—320)

This invention relates to control apparatus in general and more particularly to such an apparatus as is adapted to control variable physical quantities such as temperature, pressure, speed, light, power, phase angle and impedance, etc.

The primary object of this invention is to provide an apparatus for controlling such quantities with a maximum of precision.

Other and further objects of this invention will be apparent as the same becomes better understood from an examination of the specification and claims in conjunction with the accompanying drawings wherein:

Figure 1:
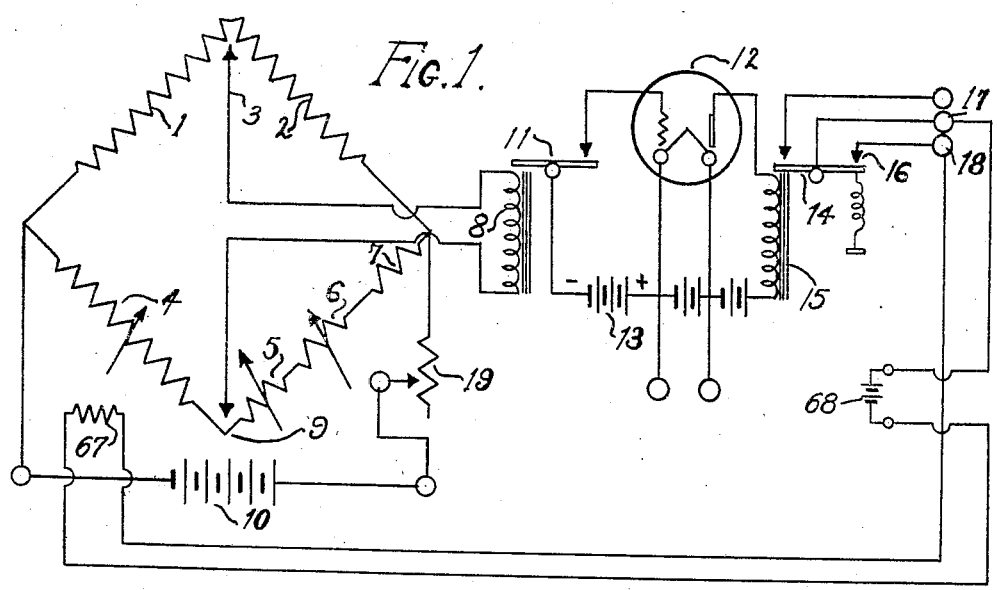
Fig. 1 is a schematic view showing a form of the apparatus.

Referring to the drawings more particularly reference characters 1 and 2 represent opposite arms of a Wheatstone bridge capable of being differentially set by a slider 3 and forming therewith a potentiometer. These resistances 1 and 2 are connected with a variable impedance 4 which forms a third arm of the Wheatstone bridge and a series of variable and fixed resistances forming the fourth arm thereof. These latter resistances include a variable resistance 5, a variable resistance 6 and a fixed resistance 7. Resistance 7 is designed to be approximately equal in value to the resistance 4 with bridge balanced and resistor 4 set at balance for reference measurement such as room temperature. Variable resistance 5 may be adjusted to compensate for external effects such as sub-normal or abnormal room temperature, etc. Variable resistance 6 may be adjusted to compensate for the leads to the resistance 4.

The variable resistance or impedance 4 may take several forms depending upon the quantity desired to be controlled. This variable impedance 4, when temperature is desired to be controlled may take the form of either of the elements shown in Figs. 7 and 8 which will be described more in detail hereinafter. When the quantity desired to be controlled is speed, light, pressure, power, phase angle, or impedance, this member 4 may take the form of the impedance members shown in Figs. 9, 10, 11, 12, 13 or 14, respectively, as will be more particularly described hereinafter.

The slider 3 is connected to one end of the winding of a relay 8 and the junction point 9 of resistances 4 and 5 is connected to the other end of said relay. When the potential supplied to the bridge by a battery 10 is unbalanced by predetermined variation of element 4, the relay switch 11 closes the grid circuit of a tube 12 causing a grid bias battery 13 in a no-current grid circuit to put a negative potential on the grid of tube 12 and thereby reduce the plate current of the tube sufficiently to release switch 14 normally closed by a relay 15 in the plate circuit. When the relay switch 14 is released, contact 16 is opened, cutting out circuit connected to points 17 and 18. When the apparatus is used to control temperature the bridge is balanced with the element 4 cold. This element 4 being situated at the point the temperature of which is desired to be controlled, when the temperature reaches the point where the decreased resistance (if negative temperature coefficient resistor type is used) or increased resistance (if positive temperature coefficient resistor type is used) in the arm of the bridge containing said element causes the closing of switch 11 and releasing of switch 14, heating coils 67 and current source 68 connected across points 17 and 18 will be cut out thereby causing lowering of temperature below control point. When the resistance of element 4 increases by drop in temperature switch 11 will re-open and switch 14 will re-close circuit containing the heating coils 67 and current source 68.

Figure 7:
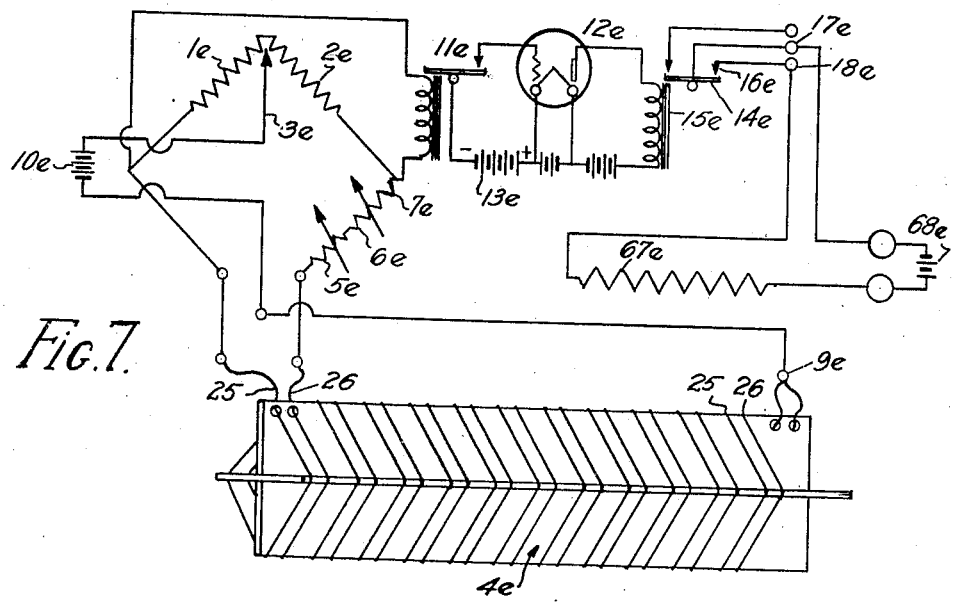
Fig. 7 is a detailed isometric view of a variable impedance element and circuit therefor where temperature control is desired.

In Fig. 7 the variable element 4e used in place of element 4 when controlling temperature is shown as coiled filaments 25 and 26 differentially wound about a core formed of a pair of longitudinally extending strips of heat proof material disposed at right angles to each other. This arrangement permits heat currents to circulate freely throughout the various coils. The filaments 25 and 26 are in the form of a pair of coils wound simultaneously and insulated from each other—one having a positive temperature coefficient and the other a negative temperature coefficient respectively. The filament 26 having the negative temperature coefficient is connected in the circuit as shown in Fig. 7 so as to be in the opposite arms of the bridge to that of the filament having the positive temperature coefficient whereby the element as a whole may act to differentially unbalance the bridge in accordance with temperature changes. Parts 1e, 2e, 5e, 6e, and 8e through 18e, inclusive, are similar to corresponding parts 1, 2, 5, 6, and 8 through 18, inclusive, respectively, in Fig. 1. Likewise parts 3e, 67e, and 68e are similar to parts 3, 67 and 68, respectively, of Fig. 1.

Figure 8:
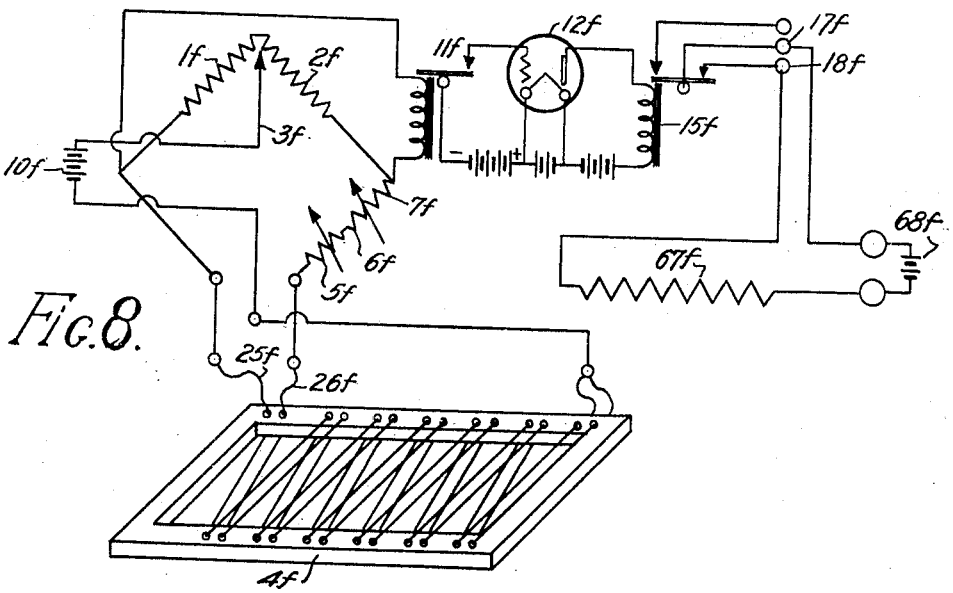
Fig. 8 is a similar view of a modification of Fig. 7.

As shown in Fig. 8 the variable element 4f adapted to be used in place of the element 4 where temperature quantities are desired to be controlled may take a somewhat different form. In this modification the two filaments here designated 25f and 26f, in themselves having positive and negative temperature coefficients, respectively, may be simultaneously strung rather than wound upon a flat heat resisting and electrically insulated frame. The other parts of the apparatus are identical with corresponding parts in Fig. 7. For example, parts 1f, 2f and so forth, through 68f, correspond to similar parts 1e, 2e, and so forth, through 68e, respectively, in Fig. 7.

Figure 9:
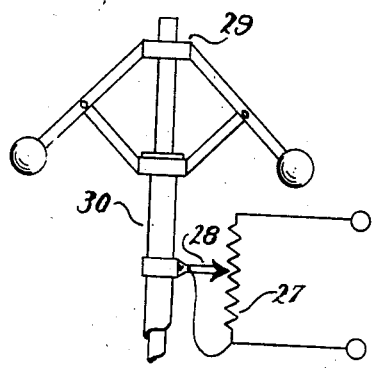
Fig. 9 is a detailed fragmentary schematic view of a variable impedance device adapted to be used in the apparatus in lieu of the element shown in Fig. 7 for speed control.

When it is desired to control speed the variable impedance 4 may take the form of a variable resistance 27 controlled by a slider 28 actuated by a governor 29 on a shaft 30, the speed of which is desired to be controlled as shown in Fig. 9.

Figure 10:
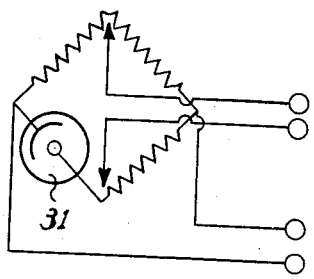
Fig. 10 is a similar view of another element adapted to be used in the apparatus in lieu of the element shown in Fig. 7 when light control is desired.

As shown in Fig. 10, when it is desired to control light quantities a light sensitive cell such as a photo-electric cell of similar device 31 may be inserted in the arm of the Wheatstone bridge to replace the element 4.

Figure 11:
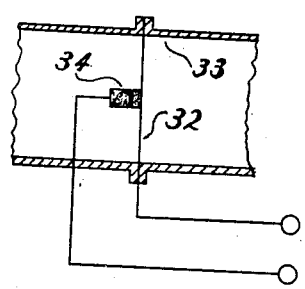
Fig. 11 is a similar view of another element adapted to be used in the apparatus in lieu of the element shown in Fig. 7 when pressure control is desired.

As shown in Fig. 11 when it is desired to control pressure quantities, a diaphragm 32 mounted in a flow tube 32 in the pressure circuit is provided with a carbon button 34, the resistance of which varies in accordance with the pressure upon the diaphragm and this button 34 is adapted to be inserted in the circuit in place of the element 4.

Figure 12:
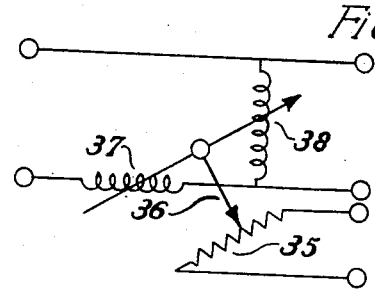
Fig. 12 is a similar view of another element adapted to be used in the apparatus in lieu of the element shown in Fig. 7 when power control is desired.
Figure 13:
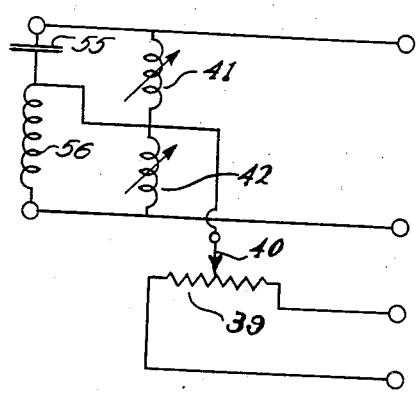
Fig. 13 is a similar view of another element adapted to be used in the apparatus in lieu of the element shown in Fig. 7 when phase angle control is desired.
Figure 14:
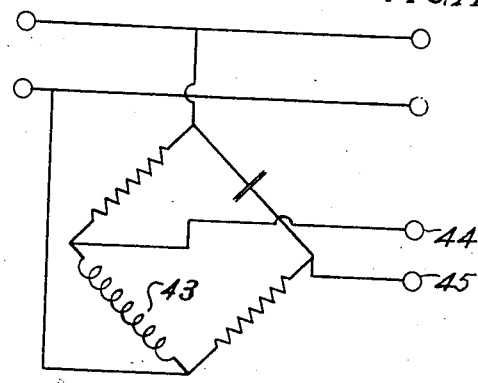
Fig. 14 is a similar view of another element adapted to be used in the apparatus in lieu of the element shown in Fig. 7 when impedance control is desired.

As shown in Fig. 12 when it is desired to control power quantities a variable resistance 35 is substituted for the element 4. This resistance 35 is varied by a slider 36 actuated by watt meter elements 37 and 38 connected in a power line, the power of which is desired to be controlled.

When it is desired to control phase angle quantities, a resistance 39 may be substituted for the element 4. This resistance 39 (Fig. 13) may be varied by a slider 40 actuated by dynamometer elements 41 and 42.

These elements 41 and 42 are adapted to be shunted across a capacitive inductive network 55—56, the latter being adapted to be placed in the circuit being measured. Dynamometer elements 41 and 42 measure, respectively, the voltage components across the capacitive reactance 56 and inductive reactance 55, the total torque being proportional to phase angle and positioning slider 40 to vary impedance element 39.

When it is desired to control impedance, impedance 43 (Fig. 14) may be substituted for the element 4, terminals 44 and 45 connected across said network being connected in the circuit where the element 4 was taken out.

Figure 2:
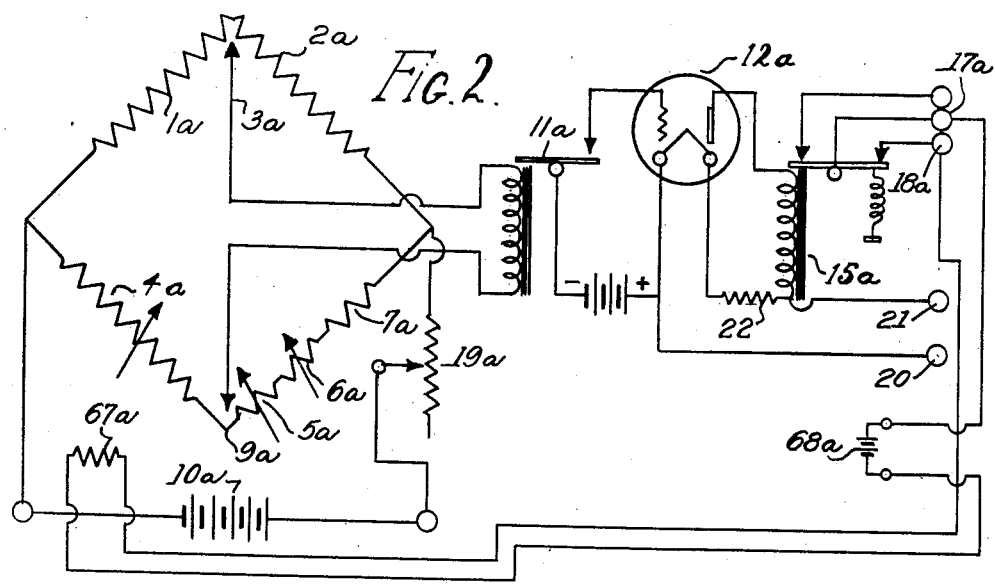
Fig. 2 is a similar view of a modification.

In Fig. 2 a form of apparatus similar to that of Fig. 1 is shown except that here the filament of the tube 12a is energized from an alternating current line through contacts 20 and 21, a resistance 22 providing the necessary drop in voltage and the relay 15a being also connected to said line. Parts 1a, 2a and so forth, through 68a, correspond to similar parts 1, 2, and so forth, through 68, in Fig. 1.

When speed is being controlled instead of placing heating coils referred to in connection with Fig. 1 across points 17 and 18, a motor (not shown) controlling a steam valve or other means (not shown) for reducing the speed might be placed thereacross. When light is being controlled suitable means (not shown) for reducing the light intensity might be placed across points 17 and 18. When pressure is being controlled suitable means such as a motor (not shown) controlling a pressure pump might be placed across these points 17 and 18. When power is being controlled suitable means (not shown) for throwing compensating inductance in the power line might be provided across the points 17 and 18. When phase angle or impedance is being controlled suitable means for throwing compensating impedance in the line may be provided across the points 17 and 18.

Figure 3:
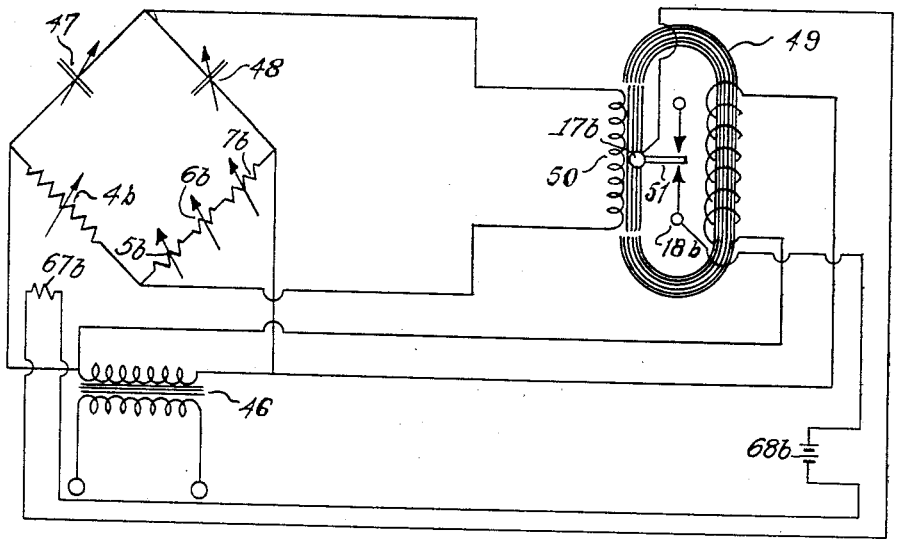
Fig. 3 is a similar view of another modification.

As shown in Fig. 3, the bridge circuit containing variable contact impedance 4b may have its potential supplied from the secondary of a transformer 46, the primary of which is connected to an alternating current source. Variable condensers 47 and 48 take the place of the potentiometer in the previous embodiment. The secondary of the transformer 46 also energizes the winding of a galvanometer 49, the armature winding 50 of which is connected across the bridge. When the bridge is unbalanced the galvanometer armature is actuated to open or close a switch 51 operable therewith to disconnect or connect contact points 17b and 18b, respectively comparable to points 17 and 18 of the first embodiment. Parts 5b to 7b, 67b and 68b correspond to similar parts 5 to 7, 67 and 68, respectively, in Fig. 1.

Figure 4:
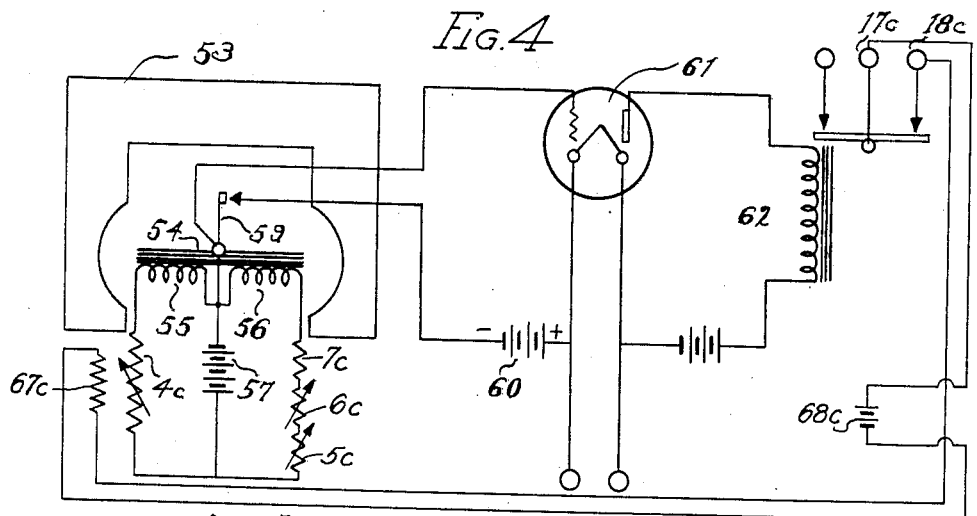
Fig. 4 is a similar view of another modification.
Figure 5:
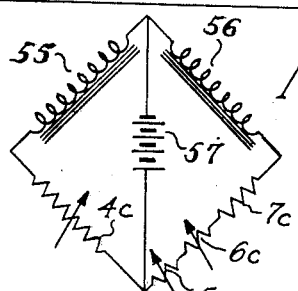
Fig. 5 is a schematic view of the bridge circuit of Fig. 4.

As shown in Fig. 4, a modified form of apparatus includes a galvanometer having a permanent magnet 53 and a differentially wound armature 54 in the bridge circuit. The armature windings include coils 55 and 56 which are oppositely wound and take the place of resistances 1 and 2 respectively in the first embodiment. A battery 57 supplies the potential to the bridge. When the resistance of element 4c which is comparable to element 4 is decreased, the armature 54 will be actuated to close switch 59 operable therewith cutting in grid bias 60 and decreasing current in plate circuit of a tube 61 releasing relay 62 and switch opening points 17a and 18b as in first embodiment. Fig. 5 shows the analogy of circuit to a bridge circuit. Parts 5c to 7c, 67c and 68c, correspond to similar parts 5 to 7, 67 and 68, respectively, in Fig. 1.

Figure 6:
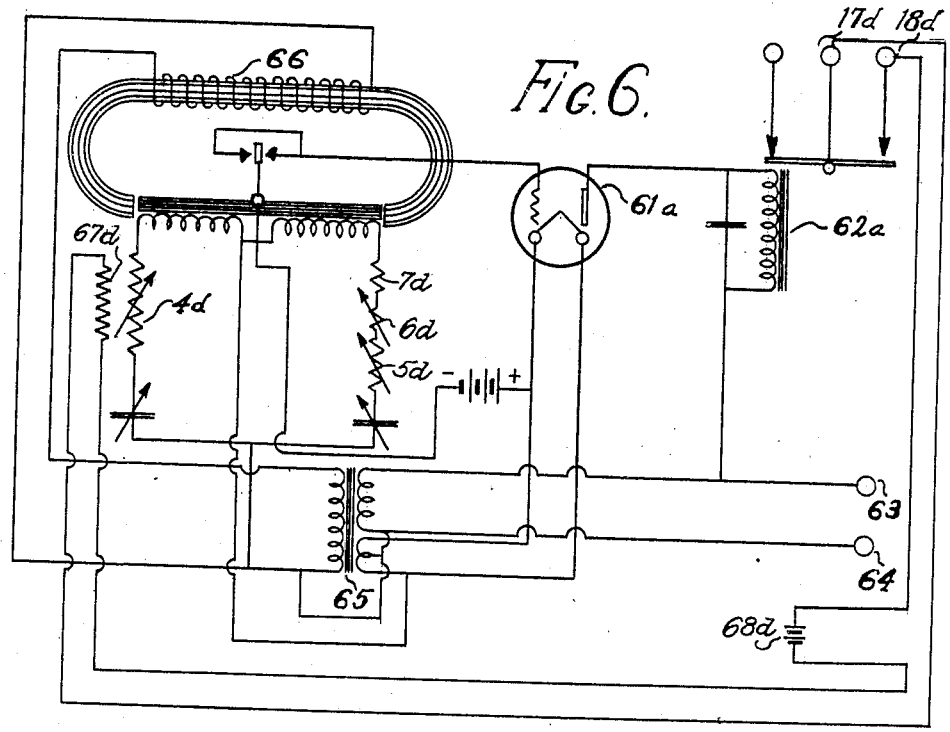
Fig. 6 is a schematic view of a modification.

The apparatus of Fig. 6 is similar to that of Fig. 4 just described except that an alternating current source is connected to points 63 and 64 for energizing a transformer 65, secondary coils of which supply energy for winding 66 of galvanometer, filament of tube 61a, and relay 62a comparable to relay 62. Except for the foregoing, the apparatus of Fig. 6 operates substantially the same as that of Fig. 4. Parts 5d to 7d, 67d and 68d, correspond to similar parts 5 to 7, 67 and 68, in Fig. 1.

The operation and advantages of the aforedescribed apparatus should be apparent without further detail.

I am aware that many changes may be made without departing from the spirit of this invention and I therefore do not wish to be limited to the details shown or described.

I claim:

1. In an apparatus of the character described, a bridge circuit, a galvanometer having oppositely wound armature coils in opposite arms of the bridge circuit, a variable impedance element in a third arm and a balancing element opposed thereto in a fourth arm, and a control circuit operable by said galvanometer when said variable element has been varied a predetermined amount.

2. In an apparatus of the character described, a bridge circuit, a galvanometer having oppositely wound armature coils in opposite arms of said bridge, a vacuum tube grid circuit adapted to be closed when said galvanometer is actuated and a plate circuit adapted to have its current reduced when said grid circuit is closed.

3. In an apparatus of the character described, a bridge circuit, a galvanometer having oppositely wound armature coils in opposite arms of said bridge, a vacuum tube grid circuit adapted to be closed when said galvanometer is actuated and a plate circuit adapted to have its current reduced when said grid circuit is closed and means for energizing the galvanometer field and the plate circuit from an alternating current source.

THEODORE A. COHEN.